United States Patent
Kim

(10) Patent No.: US 10,430,899 B2
(45) Date of Patent: Oct. 1, 2019

(54) MANAGING SYSTEM FOR MOBILE GAME BASED ON LOCATION

(71) Applicant: Jaekyung Kim, Seoul (KR)

(72) Inventor: Jaekyung Kim, Seoul (KR)

(*) Notice: Subject to any disclaimer, the term of this patent is extended or adjusted under 35 U.S.C. 154(b) by 0 days.

(21) Appl. No.: 15/525,786

(22) PCT Filed: Nov. 24, 2015

(86) PCT No.: PCT/KR2015/012606
§ 371 (c)(1),
(2) Date: Jun. 26, 2017

(87) PCT Pub. No.: WO2016/085218
PCT Pub. Date: Jun. 2, 2016

(65) Prior Publication Data
US 2018/0326297 A1    Nov. 15, 2018

(30) Foreign Application Priority Data
Nov. 24, 2014 (KR) ........................ 10-2014-0164393

(51) Int. Cl.
*A63F 13/87* (2014.01)
*G06Q 50/10* (2012.01)
(Continued)

(52) U.S. Cl.
CPC .............. *G06Q 50/10* (2013.01); *H04W 4/02* (2013.01); *H04W 4/029* (2018.02)

(58) Field of Classification Search
CPC ................................................ A63F 13/30–52
See application file for complete search history.

(56) References Cited

U.S. PATENT DOCUMENTS

2012/0157210 A1* 6/2012 Hall .................... A63F 13/65
463/40

FOREIGN PATENT DOCUMENTS

| KR | 10-2009-0003544 A | 1/2009 |
| KR | 10-2011-0001503 A | 1/2011 |
| KR | 101147301 B1 | 5/2012 |

OTHER PUBLICATIONS

International Search Report of the ISR/KR dated Mar. 2, 2016.
(Continued)

*Primary Examiner* — Omkar A Deodhar
(74) *Attorney, Agent, or Firm* — Patshegen IP LLC; Moshe Pinchas

(57) ABSTRACT

The present invention relates to a Mobile Game based on Location (MGL) managing system, which: implements communication with an MGL managing server within a program block of a user mobile device; creates an MGL execution screen that displays the user mobile device, other user mobile devices located around the user mobile device, attack guidelines, and a command menu on a background map corresponding to the location of the user mobile device; displays the created MGL execution screen through a mobile function performing module installed in the user mobile device; and if, at this time, user game managing information for the virtual destruction of another user mobile device is input or other user game managing information for the virtual destruction of the user mobile device is transmitted through the MGL managing server, processes the virtual destruction of the other user mobile device or the user mobile device according to a pre-stored MGL scenario and systematically deploys combatant modules or the like which are capable of renewing/displaying the virtual destruction of the other user mobile device or the user mobile device through the MGL execution screen. Through such a mass appeal-type content format, the active use of mobile games (Continued)

may be made possible through media that allow for the formation of large-scale social networks, media that provide strong motivation for continually maintaining already formed social networks, media that compare communication speeds to enable the objective comparison of the communication speeds of individual mobile service companies, media that maximize the positive attributes of games by changing the existing private and unsociable format of games (that has caused unfavorable conceptions and side effects) to an open and sociable format, and the like.

6 Claims, 8 Drawing Sheets

(51) Int. Cl.
*H04W 4/029* (2018.01)
*H04W 4/02* (2018.01)

(56) References Cited

OTHER PUBLICATIONS

Extended European search report of the EPO dated Apr. 9, 2018.
Neuberg: "Programming I0S 5: Fundamentals of IPhone, IPad, and IPod Touch Development" In: "Programming I0S 5: Fundamentals of IPhone, IPad, and IPod Touch Development", Mar. 22, 2012, O'Reilly, XP055463197, p. 262, 466, 467.

* cited by examiner

[Fig. 1]
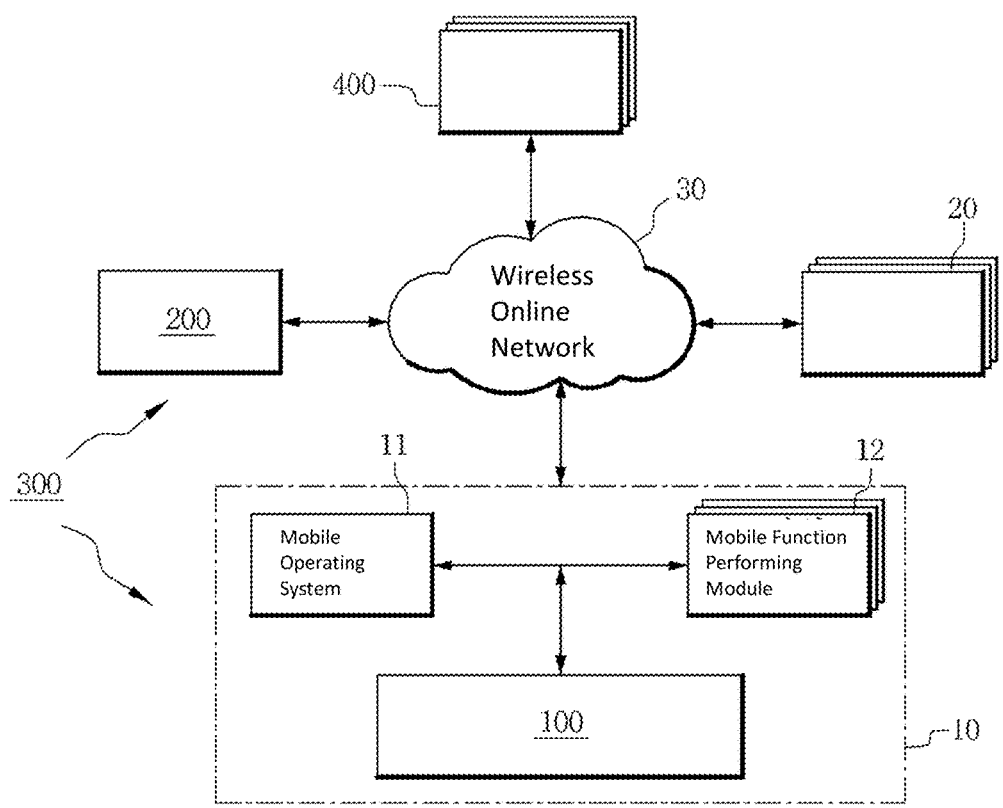

[Fig. 2]
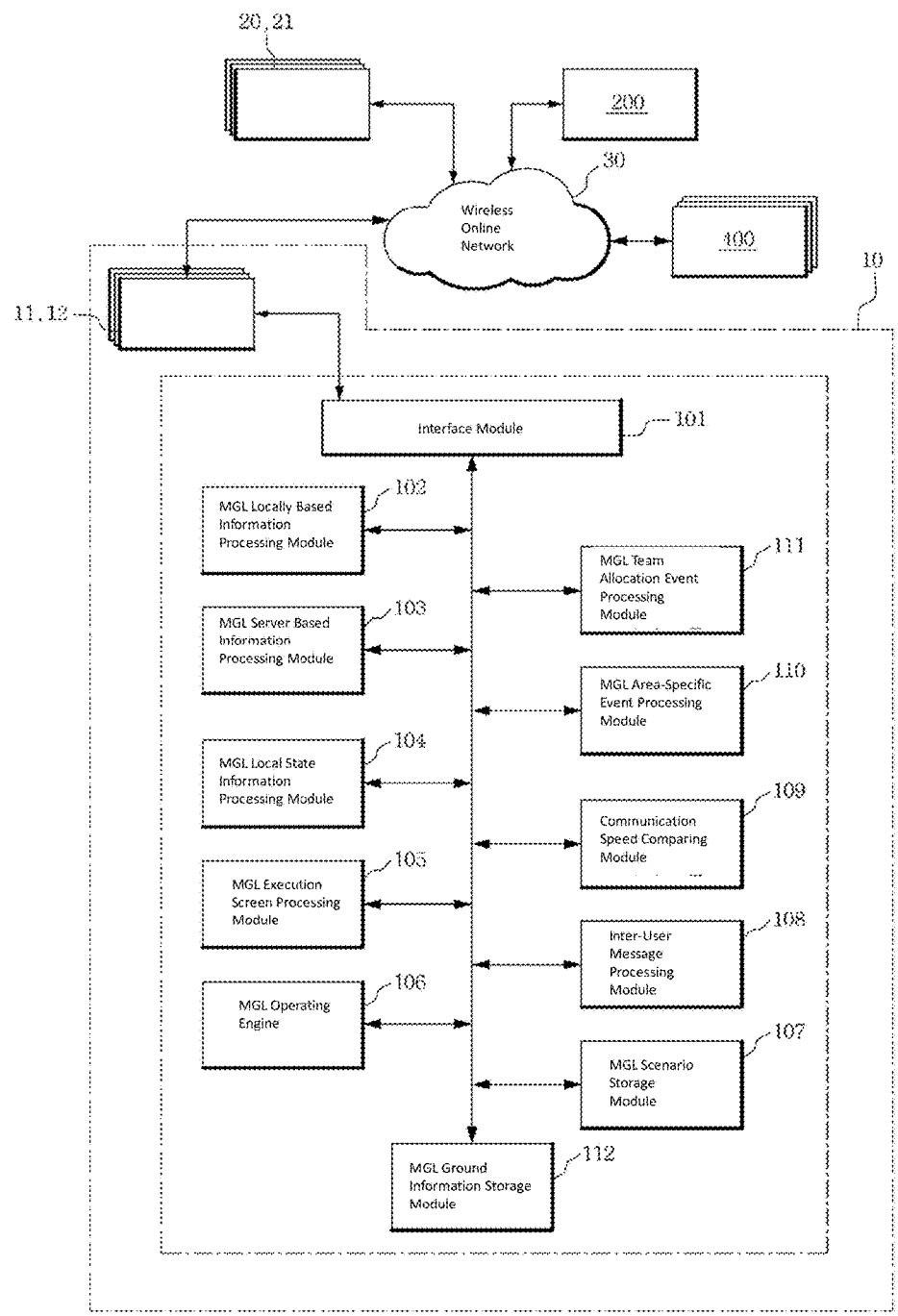

[Fig. 3]
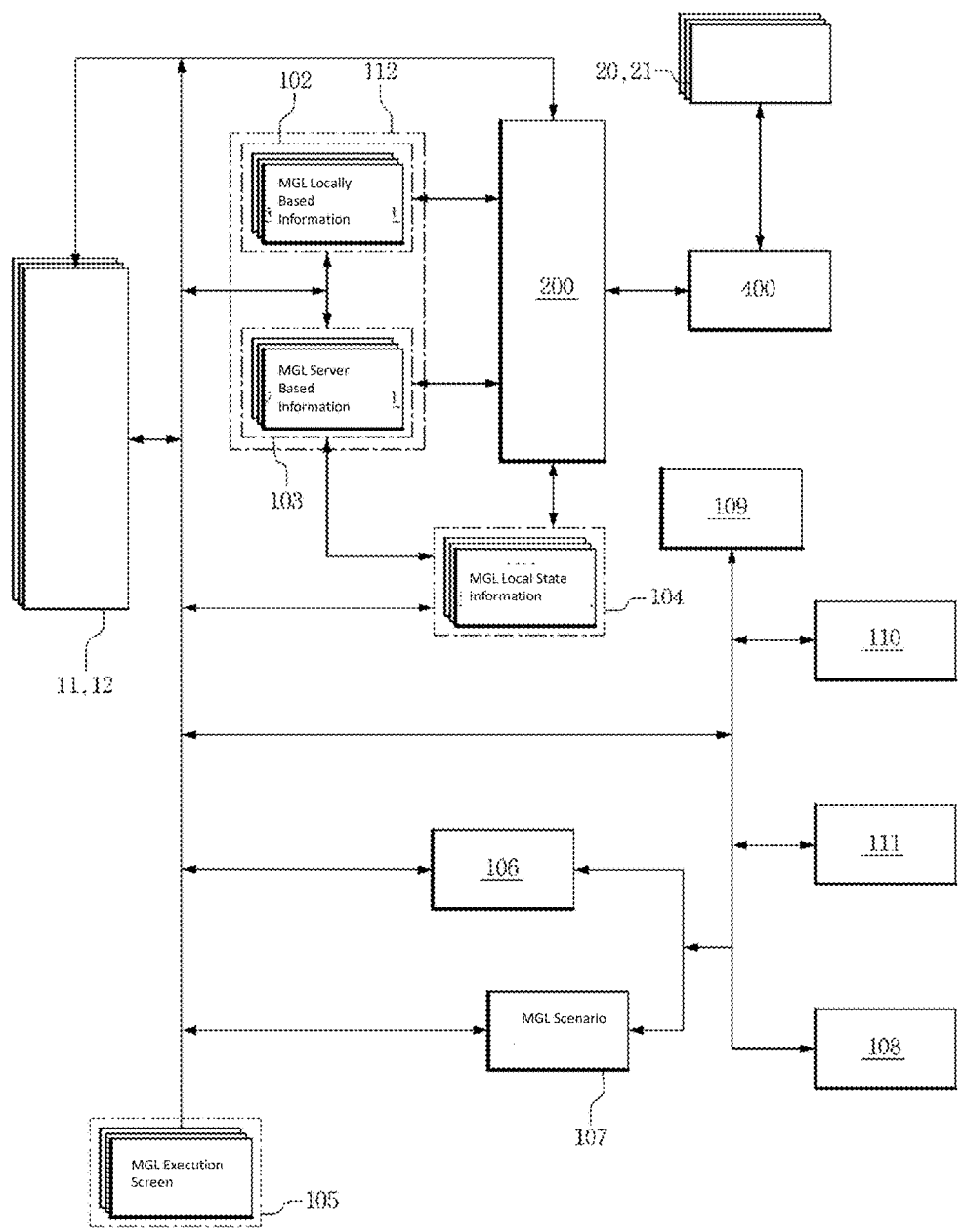

[Fig. 4]
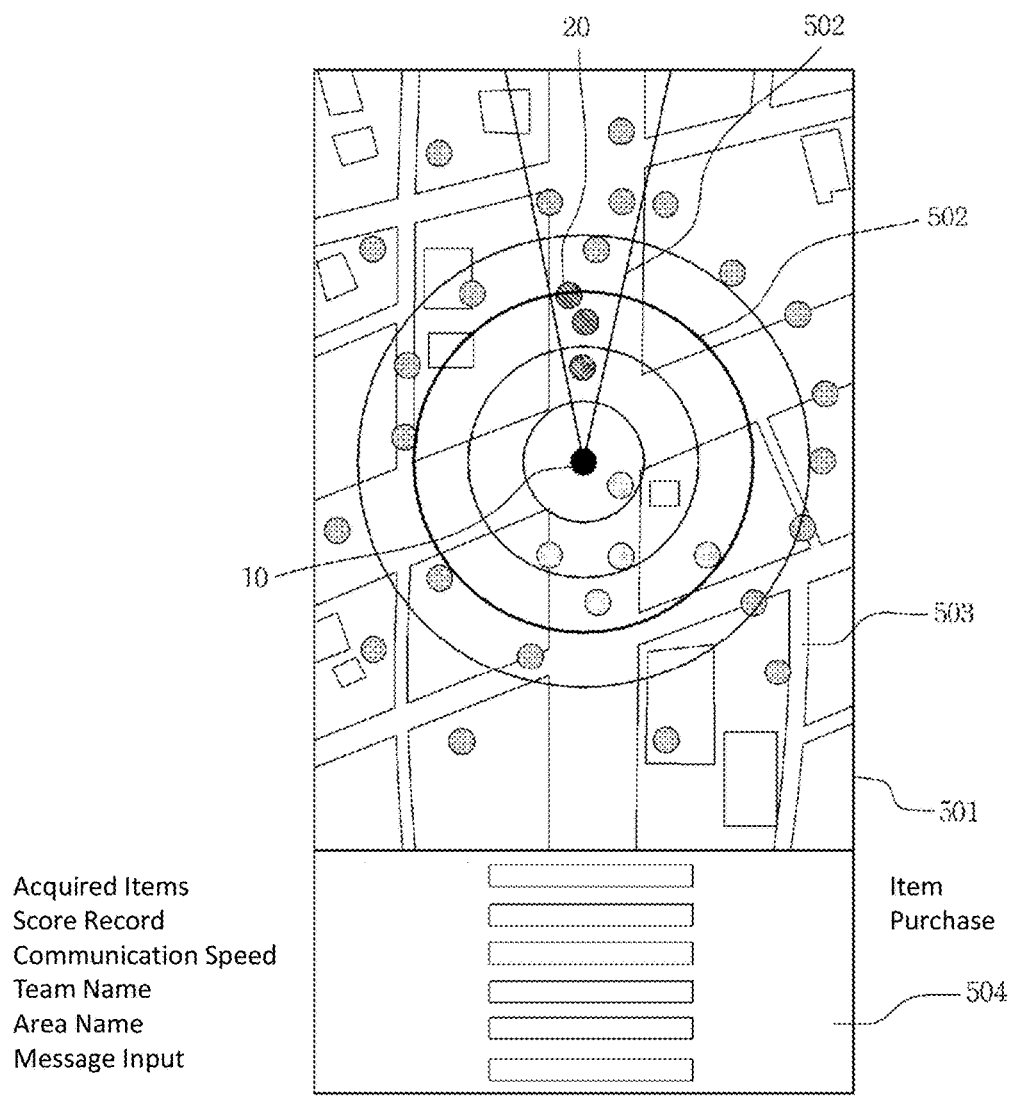

[Fig. 5]
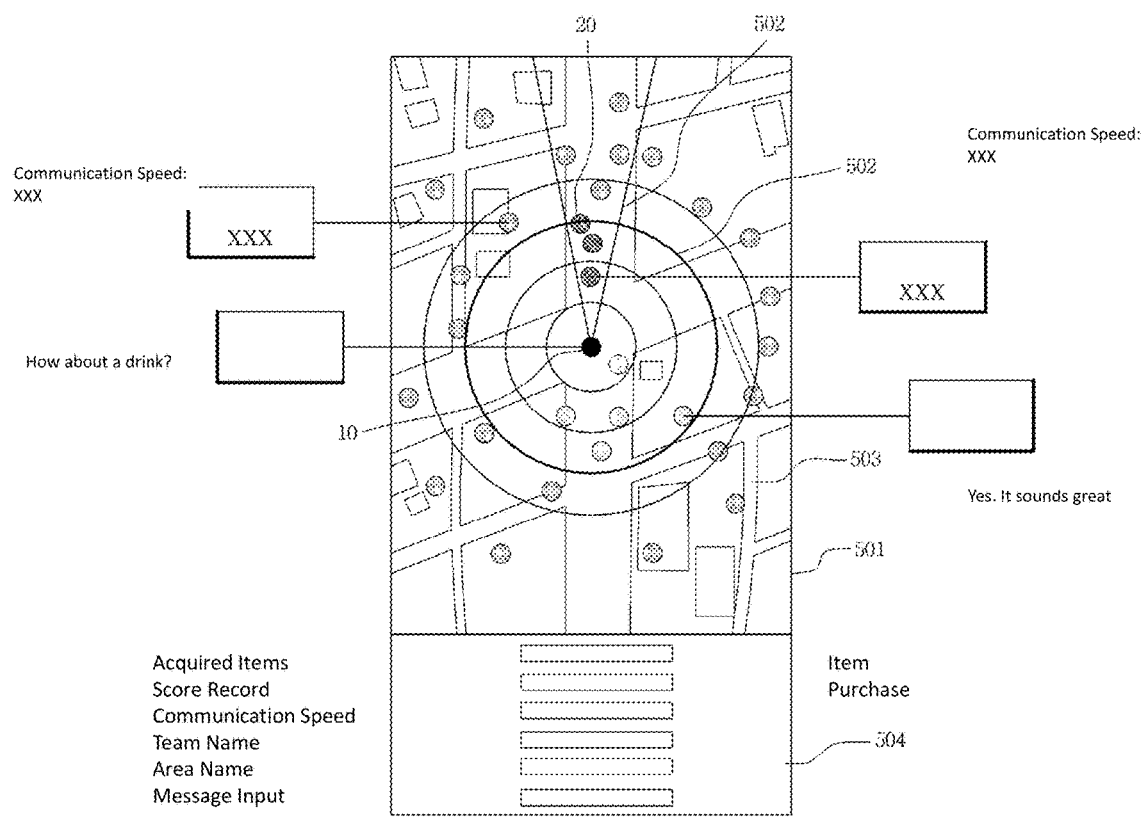

[Fig. 6]
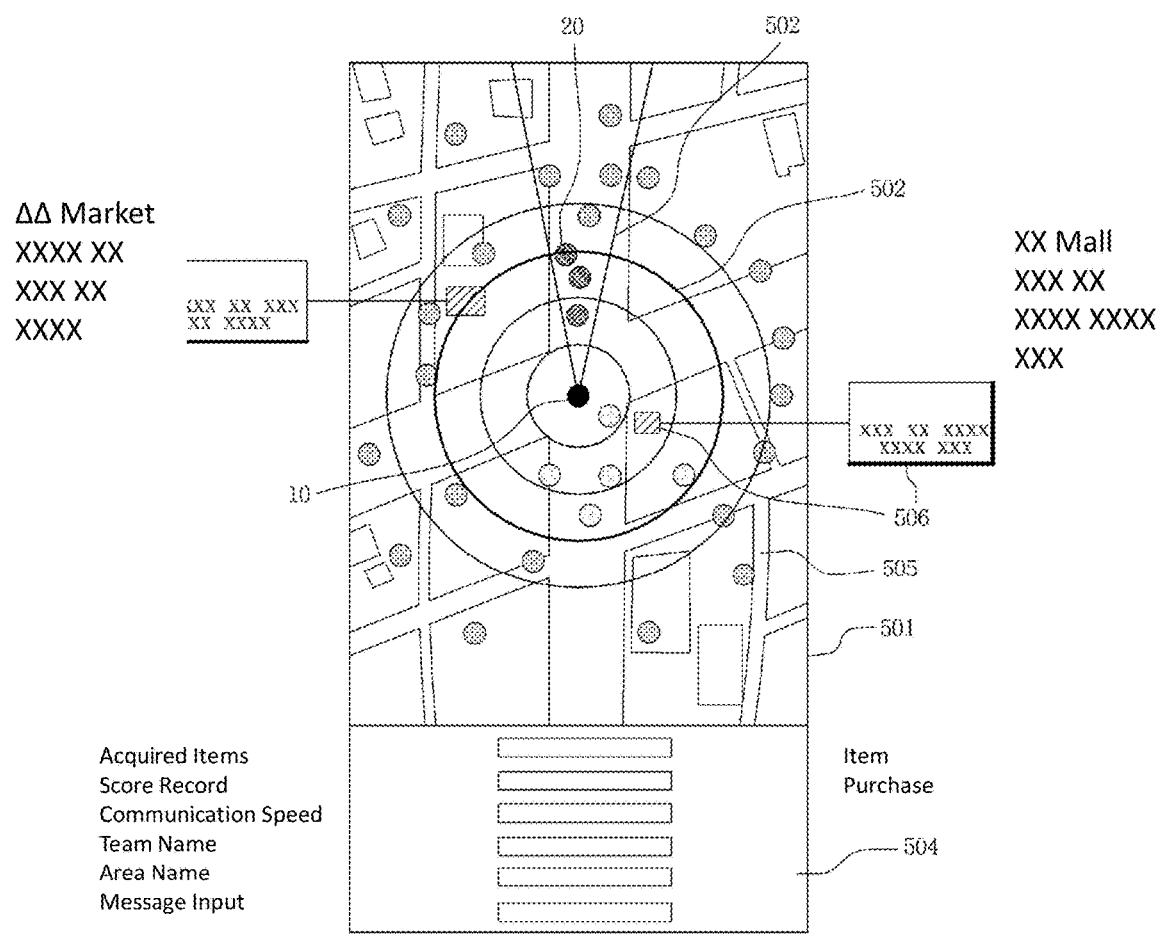

[Fig. 7]
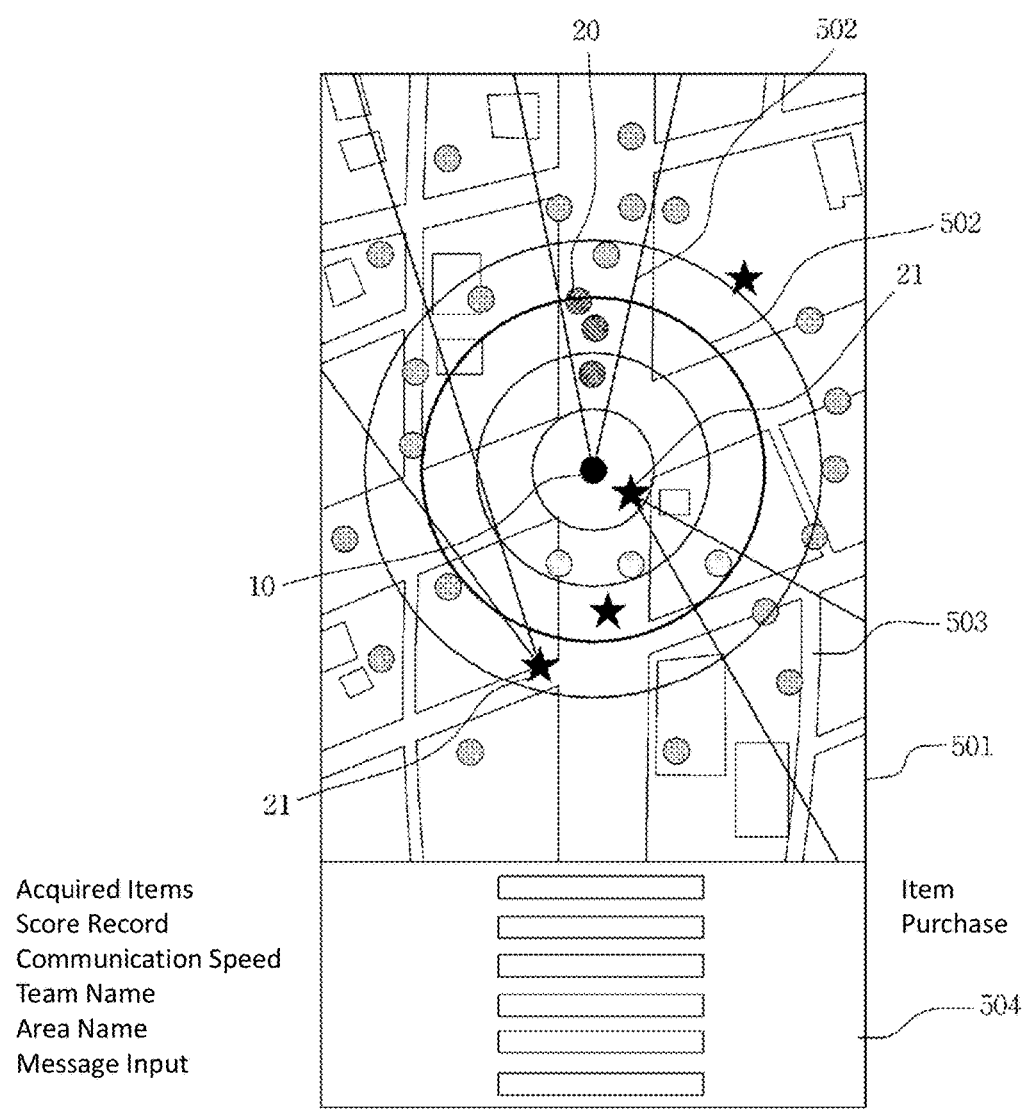

[Fig. 8]
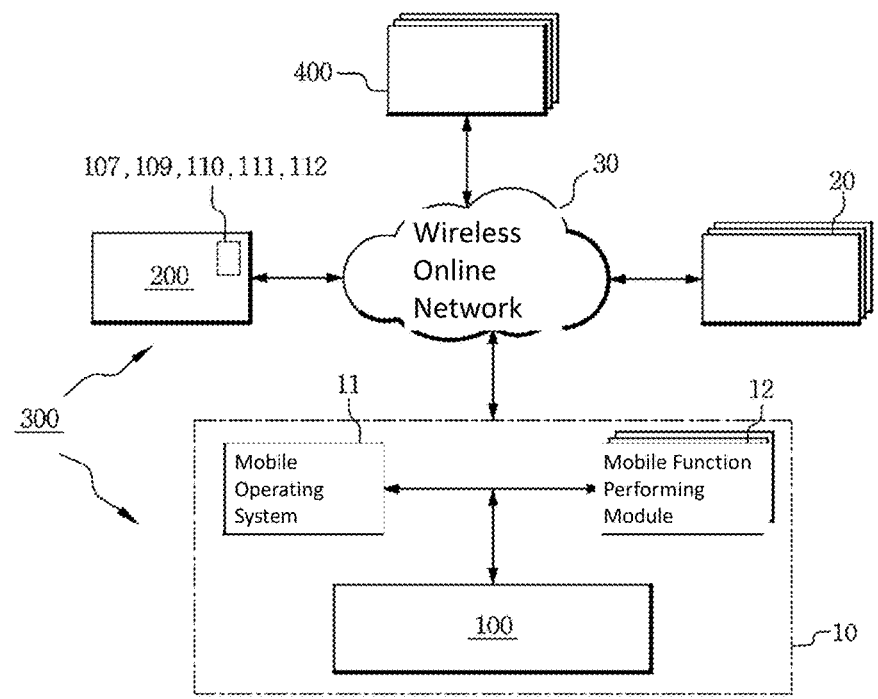

MANAGING SYSTEM FOR MOBILE GAME BASED ON LOCATION

FIELD OF THE TECHNOLOGY

The present invention is regarding a system managing a mobile game based on the location (MGL), more particularly, regarding the system managing a game wherein a user can virtually destroy other users' mobile devices around the user's location. Through this type of popularly favored contents, mobile location-based services can be actively utilized
- as a medium that allows for the formation of large-scale social networks,
- as a medium that provides strong motivation for continually maintaining already formed social networks,
- as a medium that can even compare objectively transmission speeds of individual mobile devices depending on the mobile service provider, and
- as a medium that maximizes the positive aspects of digital games, by changing individual and independent formats most games have, which caused unfavorable perceptions and side effects, into an open and prosocial format. In this way, mobile service providers may prevent the total mobile service market from shrinking, by satisfying more mobile service users.

BACKGROUND TECHNOLOGY

Recently, as the electronics, electrical, and communication technology is evolving rapidly, diverse types of mobile services making use of wireless networks (e.g., wireless internet network, etc.) are competitively implemented. They include mobile location tracking services, mobile game services, mobile messaging services, mobile social network services, and so on. Thus, auxiliary techniques and methods related to these mobile services are increasingly introduced in the market.

More detailed examples of these conventional techniques and methods can be found from Korean Patent Publication No. 10-2004-0099641. (Mobile game system and method for operating mobile game, published Dec. 2, 2004), Korean Patent Publication No. 10-2008-0082234 (Method of sending mobile message and apparatus for sending mobile message using the same, published Sep. 11, 2008), Korean Patent Publication No. 10-2012-0089934 (Mobile location tracking system and service providing method of mobile location tracking system, published Aug. 16, 2012), Korean Patent Publication No, 10-2012-0116196 (Mobile message keyword advertising message communication method and system, published Oct. 22, 2012), or the like.

However, although, as described above, several types of mobile services, such as mobile location tracking services, mobile game services, mobile messaging services, mobile social network services, etc., have been competitively provided, unfortunately, those foretold mobile services clearly revealed several limitations as follows and in its aftermath, satisfaction of the users to general mobile services also has been greatly reduced:

For one example of the foretold limitations, although conventional mobile location tracking services (or mobile location-based services) have an enormous potential to be widely used in their own ways, they merely become a secondary function of mobile devices (e.g., smart phones, tablet PCs, wireless game consoles, and laptops, etc.), because of lack of various technical attempts to widen their applications.

For the second example, despite conventional mobile services, such as messaging services, social network services, and so on, also can potentially be popularized, various technical attempts to improve their shortcomings have not been made sufficiently. For this reason, one's social networking is limited among one's acquaintances, rather than diverse service users. Otherwise, excessive identity exposure may make each users privacy seriously infringed sometimes (for example, in some friend finding mobile services, etc.). Furthermore, continuous motivation to maintain some social networks is reduced.

Of course, if due to these limitations of conventional mobile services, each user's satisfaction is greatly reduced and thus each user gets reluctant to use those mobile services, each mobile service provider should suffer the loss that the overall mobile service market greatly shrinks.

DETAILED DESCRIPTION OF THE INVENTION

Objectives of the Technology

Accordingly, the purpose of this invention is that in a program block of the user's mobile device (e.g., a smartphone, a tablet PC, a wireless game console, a laptop, etc.), several components are systematically arranged, including the following two computing modules:

The first computing module does the following three jobs:
1) It communicates with the server managing the mobile game based on the Location (MGL),
2) It creates the MGL execution screen, wherein the foretold user's mobile device, other users' mobile devices located around the user's mobile device, attack guidelines, and a command menu are indicated on the background map corresponding to the place where the user mobile device is located, and
3) It displays the created MGL execution screen via the mobile function performing modules installed in the user's mobile device (for example, the information display module), and the second computing module, under the condition that the foretold MGL execution screen is shown, does the following two jobs:
1) It processes virtual destruction of another user's or the foretold user's mobile device, according to the pre-stored MGL scenario, and
2) It updates and then displays the situation of the virtual destruction of another user's or the user's mobile device on the MGL execution screen, if the user's game action information is entered to virtually destroy another user's mobile device through the mobile operating system or the MGL mobile function performing modules installed in the user's mobile device or if another user's game action information to destroy the user's mobile device virtually is transmitted via the foretold MGL management server.

In this way, through a game, one of popularly favored contents types (for example, a game virtually destroying other users' mobile devices around a user), mobile location-based services can be actively utilized
- as a medium that allows for the formation of large-scale social networks,
- as a medium that provides strong motivation for continually maintaining already formed social networks,
- as a medium that can even compare objectively transmission speeds of individual mobile devices depending on the mobile service provider, and as a medium that maximizes the positive aspects of digital games, by changing individual and independent formats most games have, which caused unfavorable perceptions and side effects, into an open and prosocial format. Thus, mobile service providers may prevent the total mobile service market from shrinking, because of the reduction of satisfaction of the mobile service users.

Other objectives of the present invention will become more apparent from the following detailed description and the accompanying drawings.

Method to Achieve the Objectives

In order to accomplish the above objectives, the present invention introduces a game managing system including two main subsystems:

The first one is the management server to handle the mobile game based on the Location (MGL), and the second one is the MGL execution unit that is installed in the user's mobile device having the mobile operating system and the mobile function performing modules, that communicates with the foretold MGL management server, mobile operating system, and mobile function performing modules, and that executes the foretold MGL through the foretold user's mobile device.

Here, the foretold MGL execution unit includes the MGL execution screen processing module and the MGL operating engine.

First, the MGL execution screen processing module creates the MGL execution screen indicating the foretold user's mobile device, other users' mobile devices located around the user's mobile device, attack guidelines, and a command menu on the background map corresponding to the place where the user mobile device is located, and displays the created MGL execution screen via the mobile function performing modules.

Second, the MGL operating engine, under the condition that the foretold MGL execution screen is shown, processes virtual destruction of another user's or the foretold user's mobile device, according to the pre-stored MGL scenario, and displays the situation of the virtual destruction of another user's or the user's mobile device on the foretold MGL execution screen, by communicating with the foretold MGL execution screen processing module, if the user's game action information is entered to virtually destroy another user's mobile device through the foretold mobile operating system or the MGL mobile function performing modules installed in the foretold user's mobile device or if another user's game action information to destroy the user's mobile device virtually is transmitted via the foretold MGL management server.

Effect of the Invention

This invention systematically arranges, in a program block of the user's mobile device (e.g., a smartphone, a tablet PC, a wireless game console, a laptop, etc.), several computing modules, including the following two:

The first computing module does three jobs:

1) It communicates with the server managing the mobile game based on Location (MGL),
2) It creates the MGL execution screen where the foretold user's mobile device, other users' mobile devices located around the user's mobile device, attack guidelines, and a command menu are indicated OR the background map corresponding to the place where the user mobile device is located, and
3) It displays the created MGL execution screen via the mobile function performing modules installed in the user's mobile device (for example, the information display module), and the second computing module, under the condition that the foretold MGL execution screen is shown, does the following two jobs:

1) It processes virtual destruction of another user's or the foretold user's mobile device, according to the pre-stored MGL scenario, and
2) It updates and displays the situation of the virtual destruction of another user's or the user's mobile device on the MGL execution screen, if the user's game action information is entered to virtually destroy another user's mobile device through the mobile operating system or the MGL mobile function performing modules installed in the user's mobile device or if another user's game action information to destroy the user's mobile device virtually is transmitted via the foretold MGL management server.

Thus, under the system of this invention, each mobile service provider can actively utilize mobile location-based services, through a game, one of popularly favored contents types (for example, a game virtually destroying other users' mobile devices around a user), as a medium that allows for the formation of large-scale social networks, as a medium that provides strong motivation for continually maintaining already formed social networks, as a medium that can even compare objectively transmission speeds of individual mobile devices depending on the mobile service provider, and as a medium that maximizes the positive aspects of digital games, by changing individual and independent formats most games have, which caused unfavorable perceptions and side effects, into an open and prosocial format, and, eventually, may prevent the total mobile service market from shrinking, because of the reduction of satisfaction of the mobile service users.

BRIEF DESCRIPTION OF DRAWINGS

FIG. 1 illustrates an exemplary schematic for the communication environment of the MGL managing system in accordance with the present invention.

FIG. 2 illustrates an exemplary schematic for the detailed configuration of the MGL managing system in accordance with the present invention.

FIG. 3 illustrates an exemplary schematic for a detailed procedure to perform the MGL managing system's functions, according to the present invention.

FIGS. 4 to 7 illustrates an exemplary schematic for display patterns of MGL execution screens according to the present invention.

FIG. 8 illustrates an exemplary schematic for the communication environment of the MGL managing system in accordance with another embodiment of the present invention.

BEST CASE FOR EMBODIMENT OF THE INVENTION

Hereinafter with reference to the attached drawings, more detailed description of the MGL managing system according to the present invention is as follows:

As shown in FIG. 1, the MGL Managing System (300), according to the present invention, has the configuration to systematically combine the MGL Execution Unit (100) and the MGL Management Server (200).

The MGL Execution Unit (100) is installed in the User's Mobile Device (10) (e.g., a smartphone, a tablet PC, a wireless game console, a laptop, etc.) having the Mobile Operating System (11) and the Mobile Function Performing Modules (12) (for example, an information display module, a memory module, a sound input output module, the touch signal handling module, a program module, a kernel module, etc.).

And, the MGL Management Server (200), while communicating with the foretold MGL Execution Unit (100) via the Wireless Network (30), generally manages the following jobs:

1) the procedure for installing the MGL Execution Unit (100) within the User's Mobile Device (10),
2) the procedure to register, update, save, and manage the MGL server-based information (for example, each user's registration information, each user's account information, each user's mobile device registration information, each mobile device's real-time location information, each user's current item information, each user's MGL score record information, and so on),
3) the procedure to send the game action information (e.g., attack information to virtually destroy another user's mobile device, etc.), transmitted from the MGL Execution Unit (100) installed in a User's Mobile Device (10), to the MGL Execution Unit (100) installed in Another User's Mobile Device (20),
4) the procedure to send the user's messages transmitted from the MGL Execution Unit (100) installed in a User's Mobile Device (10) to the MGL Execution Unit (100) installed in Another User's Mobile Device (20),
5) the procedure to provide the time when another user's game action information is entered, the time of virtual destruction of Another User's Mobile Device (20), and the like, to the MGL Execution Unit (100) installed in a User's Mobile Device (10),
6) the procedure to acquire and identify the current location of each User's Mobile Device (10, 20), while communicating with the Mobile Communication Service Server (400), and so on.

In this case, as illustrated in FIG. 2, the MGL Execution Unit (00) has the configuration to systematically and tightly combine the interface Module (101),
the MGL Locally Based Information Processing Module (102),
the MGL Server-Based Information Processing Module (103),
the MGL Local State Information Processing Module (104),
the MGL Execution Screen Processing Module (105),
the MGL Operating Engine (106),
the MGL Ground Information Storage Module (112),
the MGL Scenario Storage Module (107),
the Inter-User Message Processing Module (108),
the Communication Speed Comparing Module (109),
the MGL Area-Specific Event Processing Module (110),
the MGL Team Allocation Event Processing Module (111), and so on.

Here, the MGL Locally Based Information Processing Module (102), via the Wireless Network (30) etc., communicates with the MGL Management Server (200), the mobile Operating System (11), the Mobile Function Performing Modules (12) (for example, an information display module, a memory module, a sound input/output module, the touch signal handling module, a program module, a kernel module, etc.), and so on, Here, as shown in FIG. 3, when the MGL is started by the user's control of the User's Mobile Device (10), and, therefore, a series of commands notifying the game-start event are transmitted from the Mobile Operating System (11) and the Mobile Function Performing Modules (12), etc., the MGL Locally Based Information Processing Module (102), by communicating with the Mobile Operating System (11) and Mobile Function Performing Modules (12), etc., does the following work:

1) It accesses the MGL Ground Information Storage Module (112),
2) It extracts the MGL locally based information (for example, the current user registration information, current user mobile device registration information, current user carrier information, MGL running background region setting information, MGL team allocation information, current user nickname information, current user game preference information, etc.), prestored in its data storage area,
3) Then, it communicates with the MGL Management Server (200) via the Interface Module (101), Wireless Network (30), and so on, and
4) It sends the extracted MGL locally based information to the MGL Management Server (200).

Thus, this supports a sequence of MGL operating procedures to run normally without any problem, according to the present invention.

In addition, when the MGL is started by the user's control of the User's Mobile Device (10), and, therefore, a series of commands notifying the game-start event are transmitted from the Mobile Operating System (11) and the Mobile Function Performing Modules (12), etc., the MGL Server-Based Information Processing Module (103), by communicating with the Mobile Operating System (11) and Mobile Function Performing Modules (12), etc., does the following:

1) It communicates with the MGL Management Server (200) via the Interface Module (101), Wireless Network (30), and so on,
2) It receives the MGL server based information (for example, other users' registration information, other users' account information, other users' mobile device registration information, other users' mobile device real-time location information, other users' current item information, other users' MGL score record information, etc.), transmitted from the server.
3) It then communicates with the MGL Ground Information Storage Module (112), and,
4) it stably saves the received MGL server based information at the data storage area of the MGL Ground Information Storage Module (112).

Thus, this supports a sequence of MGL operating procedures to proceed normally without any problem, according to the present invention (See FIG. 3)

Furthermore, when the MGL is started by the user's control of the User's Mobile Device (10), and, therefore, a series of commands notifying the game-start event are transmitted from the Mobile Operating System (11) and the Mobile Function Performing Modules (12), etc., the MGL Local State Information Processing Module (104), by communicating with the Mobile Operating System (11) and Mobile Function Performing Modules (12), etc., does the following:

1) It receives a series of MGL local state information (e.g., communication connection status of the User's Mobile Device (10), program upload status of the User's Mobile Device (10), the current position of the User's Mobile Device (10), etc.), reflecting the current situation of the User's Mobile Device (100), and then,
2) By communicating with the MGL Management Server (200) via the Interface Module (101), Wireless Network (30), and so on, it sends the received MGL local state information to the MGL Management Server (200).

Thus, this supports a sequence of MGL operating procedures to run normally without any problem, according to the present invention. (see FIG. 3).

Under this situation, the MGL Ground Information Storage Module (112) communicates with the MGL Locally Based Information Processing Module (102), the MGL Server-Based Information Processing Module (103), the MGL Local State Information Processing Module (104), and the like. And it stably saves and manages, in its own data storage area, various MGL ground information received from them and required to generate the MGL Execution Screen (501) (See FIGS. 4 to 7), the MGL server-based information, the MGL locally based information, the MGL local state information, and so on.

Thus, this supports a sequence of MGL operating procedures to proceed normally without any problem, according to this invention.

Here, the foretold MGL ground information includes map information, character information, image information, picture information, link information, sound information, setting information, and so on.

And, the foretold MGL server-based information includes other users' registration information, other users' account information, other users' mobile devices registration information, other users' mobile devices' real-time location information, other users' current item information, other users' MGL score records information, etc.

Furthermore, the foretold MGL locally based information includes the current user registration information, the current user mobile device registration information, the current user carrier information, the MGL running background region setting information, the MGL team allocation information, the current user's nickname information, the current user's game configuration information, etc.

Finally, the foretold MGL local state information includes communication connection status of the User's Mobile Device (10), program upload status of the User's Mobile Device (10), the current position of the User's Mobile Device (10), etc. (see FIG. 3).

On the other hand, under the situation when, through the respective steps described above, a set of the MGL operating environment is equipped, when the MGL is started by the user's control of the User's Mobile Device (10), and, therefore, a series of commands notifying the game-start event are transmitted from the Mobile Operating System (11) and the Mobile Function Performing Modules (12), etc., the MGL Execution Screen Processing Module (105), by communicating with the Mobile Operating System (11), Mobile Function Performing Modules (12), and so on, does the followings:
1) It interacts with the MGL Ground Information Storage Module (112),
2) It reads and extracts various MGL ground information prestored in its data storage area, required to generate the MGL Execution Screen (501), the MGL server-based information, the MGL locally based information, the MGL local state information, and so on, and then
3) By proceeding with a set of information generating routines, as shown in FIG. 4, it generates the MGL Execution Screen (501) indicating the User's Mobile Device (10), Other Users' Mobile Devices (20) around the user mobile device (of course, these Other Users' Mobile Devices (20) are the mobile devices belong to other users who pre-registered for the MGL), Attack Guidelines (502), the Command Menu (504), and the like on a Background Map (503) corresponding to the location of the User's Mobile Device (10) (see FIG. 3).

In this way, when it is completed to generate the MGL Execution Screen (501) indicating the User's Mobile Device (10), Other Users' Mobile Devices (20) around the User's Mobile Device, Attack Guidelines (502), the Command Menu (504), and so on, on the Background Map (503) corresponding to the location of the User's Mobile Device (10), the MGL Execution Screen Processing Module (105) does the following:
1) It communicates with the Mobile Operating System (11) and the Mobile Function Performing Modules (12) (for example, an information display module, a memory module, a sound input/output module, the touch signal handling module, a program module, a kernel module, etc.), and
2) it displays the generated MGL Execution Screen (501) via the Mobile Function Performing Modules (12) (for example, the information display module).

Thus, with this MGL Execution Screen (501) being displayed, this makes the user easily without much difficulty enjoy the MGL provided by the present invention (e.g., a mobile game to virtually destroy Other User's Mobile Device (20) located within the Attack Guideline (502), with various kinds of attack methods, such as by changing the direction of the user's mobile device, by using a voice input, and by touching and dragging the screen with a finger, or the like) (see FIG. 4).

Through the above procedure, under the circumstances when the MGL Execution Screen (501) indicating the User's Mobile Device (10), Other Users' Mobile Devices (20) around the User's Mobile Device, Attack Guidelines (502), the Command Menu (504), and so on, on the Background Map (503) corresponding to the location of the User's Mobile Device (10) is displayed via the Mobile Function Performing Module (12) (for example, information display module), the MGL Operating Engine (106) communicates with the Mobile Operating System (11), Mobile Function Performing Modules (12), the MGL Scenario Storage Module (107), the MGL Management Server (200), etc. And it examines whether the user game action information, to interact with Other Users' Mobile Devices (20) (e.g., to destroy Other Users' Mobile Devices (20) virtually), is entered, or whether other user's game action information, to interact with the User's Mobile Device (10) (e.g., to destroy the User's Mobile Device (10) virtually), is transmitted from the Mobile Operating System (11), Mobile Function Performing Modules (12), MGL Management Server (200), etc. (see FIG. 3).

In this case, when it is found that the user entered the user game action information, to interact with Other Users' Mobile Devices (20) or another user transmitted other user's game action information, to interact with the User's Mobile Device (10), by changing the direction of the mobile device, by using a voice input, by touching and dragging the screen with a finger, or the like, the MGL Operating Engine (106) reads and checks the MGL scenario prestored in the MGL Scenario Storage Module (107). And, in accordance with the MGL scenario, it proceeds to make the interactions (e.g., to process the virtual destruction) occur for Another User's Mobile Device (20) or the User's Mobile Device (10) (see FIG. 4).

Here, the foretold. MGL scenario may include "Proceed with destruction of the mobile device exposed to other's attack sooner.", "Recover the destroyed mobile device after 1 hour.", "If a mobile device is clicked, show its score record, defense level, and attack level.", "when the destruction of a mobile device is processed, mark its score record.", etc.).

In this way, when, in accordance with the MGL scenario, Other User's Mobile. Device (20) and the User's Mobile Device (10) are interacting (for example, virtually destroyed), the MGL Operating Engine (106), by communicating with the MGL Execution Screen Processing Module (105), proceeds to transmit the notice, such as "Process the virtual destruction of other user's mobile device with a serial number of AAA.", "Process the virtual destruction of the user's mobile device with a serial number of BBB.", or the like.

If through the above procedures, the notice as exemplified above is delivered, the MGL Execution Screen Processing Module (105), by running a series of information updating routine in accordance with the notice, proceeds to display via the MGL Execution Screen (501), the situation of the interaction between the Other User's Mobile Device (20) and the User's Mobile Device (10) (for example, the situation of virtual destruction of the Other User's Mobile Device (20) or the User's Mobile Device (10)) corresponding to each notice. In this way, the user or the other user can visually or auditorily in real time check the effects, such as 1) the disappearance of the Other User's Mobile Device (20) attacked by the user, from the MGL Execution Screen (501), with a series of explosive clouds and sounds,
2) the disappearance of the User's Mobile Device (10) attacked by the other user, from the MGL Execution Screen (501), with a series of explosive clouds and sounds, and so on (of course, such visual or auditory effects may vary depending on the already configured MGL scenario), very interestingly enjoying the MGL originated from the present invention where one can virtually destroy Other User's Mobile Device (20) located within Attack Guidelines (502) with various kinds of attack methods, such as by changing the direction of the mobile device, by using a voice input, by touching and dragging the screen with a finger, or the like.

Then, the MGL Operating Engine (106), by communicating with the MGL Management Server (200) via the Interface Module (101) and Wireless Network (30), transfers the operating situation of the MGL (for example, the virtual destruction of the user's mobile device, etc.) regularly to the MGL Management Server (200) so that various kinds of information (for example, score records, etc.) managed by the MGL Management Server (200) can be always maintained at the latest status (of course, this local-side update information can be varied widely in different types or contents, depending on the situation).

On the other hand, through the above procedures, under the circumstances when the MGL originated from the present invention, where one can virtually destroy Other User's Mobile Device (20) located within Attack Guidelines (502) with various kinds of attack methods, is operated by the user (or the other user), the Inter-User Message Processing Module (108), by communicating with the Mobile Operating System (11), Mobile Function Performing Modules (12), the MGL Execution Screen Processing Module (105), the MGL Management Server (200), etc., checks whether the user's messages or the other user's messages are transmitted from them (see FIG. 3).

Now, as shown in FIG. 5, when the user, through the Command Menu (504) contained in the MGL Execution Screen (501), composes the user's message (e.g., "How about a drink?", "Yes, it sounds great.", etc.), and sends the corresponding user's message via the Mobile Operating System (11), Mobile Function Performing Modules (12), the MGL Execution Screen Processing Module (105), and the like, the Inter-User Message Processing Module (108), by communicating with them, receives that corresponding user's message and then, by taking the communication with the MGL Management Server (200) via the Interface Module (101) and Wireless Network (30), etc., proceeds to transfer the received user's message toward the MGL, Management Server (200) (see. FIG. 3).

Of course, under this procedure, the MGL Management Server (200) proceeds to transfer the corresponding user's message to the Other User's Mobile Device (20) via Wireless Network (30), and in the end, the other user participating in the MGL can check, in real time without difficulty, the foretold user's message (e.g., "How about a drink?", "Yes, it sounds great.", etc.) (see FIG. 5).

In addition, when the other user composes the other user's message (e.g., "How about a drink?", "Yes, it sounds great.", etc.), and sends the corresponding message via the MGL Management Server (200), the Inter-User Message Processing Module (108), by communicating with the MGL Management. Server (200), receives the corresponding message and then, by communicating with the MGL Execution Screen Processing Module (105), proceeds to display the received message on the MGL Execution Screen (see FIG. 3).

Of course, also under this procedure, the user participating in the MGL can check, in real time without difficulty, the other user's message (for example, "How about a drink?", "Yes, it sounds great.", and the like) (see FIG. 5).

On the other hand, according to the above procedures, under the circumstances when the MGL originated from the present invention, where one can virtually destroy Other User's Mobile Device (20) located within Attack Guidelines (502) with various kinds of attack methods, is operated by the user (or the other user), the Communication Speed Comparing Module (109), by communicating with the MGL Management Server (200), the Mobile Operating System (11), Mobile Function Performing Modules (12), the MGL Operating Engine (106), etc., proceeds to read out the input times and input order of the user's game action information and the other user's game action information, and the order of the virtual destructions of the User's Mobile Device (10) and the Other User's Mobile Device (20) (see FIG. 3).

Thus, when it is completed to read out the input times and input order of the user's game action information and the other user's game action information, and the order of the virtual destructions of the User's Mobile Device (10) and the Other User's Mobile Device (20), the Communication Speed Comparing Module (109), by running a series of information comparing routines, compares the input times and input order of the user's game action information and the other user's game action information, and the order of the virtual destructions of the User's Mobile Device (10) and the Other User's Mobile Device (20). And then, by running a series of information generating routines, it proceeds to create the communication speed comparison information for each user's mobile device, having details, such as "As the communication speed of AA Kim (010-AXXXX-BBBB) is faster than that of DD Song (010-CCCC-FFFF) by CCC, DD Song's smartphone was destroyed (see FIG. 3)."

Through the above procedure, when it is completed to create the communication speed comparison information for each user's mobile device, having details, such as "As the communication speed of AA Kim (010-AXXXX-BBBB) is faster than that of DD Song (010-CCCC-FFFF) by CCC, DD Song's smartphone was destroyed," the Communication Speed. Comparing Module (109), by communicating with the MGL Execution Screen Processing Module (105), proceeds to display the created communication speed comparison information for each user's mobile device via the MGL Execution Screen (501) (see FIG. 5). And thus, the user or the other user can without much difficulty compare the communication speed of the user's mobile device and that of the other user's mobile device, under the very natural circumstances participating in the MGL.

Thus, in the present invention, in a program block of the User's Mobile Device (10) (e.g., a smartphone, a tablet PC, a wireless game console, a laptop, etc.), several computing modules are systematically arranged, including the following two:

1) A computing module
   that communicates with the Management Server (200) managing the mobile game based on the Location (MGL),
   that creates the MGL Execution Screen (501), where the foretold User's Mobile Device (10), Other Users' Mobile Devices (20) located around the foretold User's Mobile Device (10), Attack Guidelines (502), and a Command Menu (504) are indicated on the background map corresponding to where the User's Mobile Device (10) is located, and
   that displays the created MGL Execution Screen (501) via the Mobile Function Performing Modules (12) installed in the User's Mobile Device (10) (for example, the information display module)>, and 2) A computing module under the condition that the MGL Execution Screen (501) is shown,
   that processes virtual destruction of Another Users Mobile Device (20) or the User's Mobile Device (10), according to the prestored MGL scenario, and
   that visually and auditorily updates and displays the situation of the virtual destruction of Another User's Mobile Device (20) or the User's Mobile Device (10) on the MGL Execution Screen (501), if the user's game action information is entered to virtually destroy Another User's Mobile Device (20) through the Mobile Operating System (11) or the MGL Mobile Function Performing Modules (12) installed in the User's Mobile Device (10) or if another user's game action information to destroy the User's Mobile Device (10) virtually is transmitted via the foretold MGL Management Server (200).

Thus, under the system of the present invention, each mobile service provider can actively utilize a set of mobile location-based services, through a game, one of popularly favored contents types (for example, a game virtually destroying other users' mobile devices around a user),
   as a medium that allows for the formation of large-scale social networks,
   as a medium that provides strong motivation for continually maintaining already formed social networks,
   as a medium that can even compare objectively transmission speeds of individual mobile devices depending on the mobile service provider, and
   as a medium that maximizes the positive aspects of digital games by changing individual and independent formats most games have, which caused unfavorable perceptions and side effects, into an open and prosocial format,
and, eventually, may prevent the total mobile service market from shrinking, because of the reduction of satisfaction of the mobile service users.

In addition to those computing modules described above, as shown in FIG. 2, the MGL Area-Specific Event Processing Module (110), the MGL Team Allocation Event Processing Module (111), and so on are arranged further in the program block of the MGL Managing System (100) of the present invention.

Now, as shown in FIG. 6, under the circumstances that the MGL Execution Screen (501) is generated by the MGL Execution Screen Processing Module (105), the MGL Area-Specific Event Processing Module (110), by communicating with the MGL Ground Information Storage Module (112), reads out the MGL ground information prestored in its data storage area, and through this, proceeds to check whether a particular area is designated by the user's pre-setting as an MGL Running Background Area (see FIG. 3).

At this time, in the case when it is found that a particular area is designated by the user's pre-setting as an MGL Running Background Area, the MGL Area-Specific Event Processing Module (110), by communicating with the MGL Ground Information Storage Module (112), proceeds to run a set of information extracting routines, to extract the Specific Region Background Map (505) corresponding to the foretold particular area among various background maps prestored in an data storage area of the MGL Ground Information Storage Module (112). And then, it proceeds to transmit the extracted Specific Region Background Map (505) to the MGL Execution Screen Processing Module (105), by communicating with the MGL Execution Screen Processing Module (105) (see FIGS. 3 and 6).

Of course, by this process, under the condition that a Specific Region Background Map (505) is transmitted, the MGL Execution Screen Processing Module (105) can without much difficulty create the MGL Execution Screen (501) indicating the User's Mobile Device (10), the Other User's Mobile Device (20) located close to the User's Mobile Device (10), Attack Guidelines (502), a Command Menu (504), and the like, on the Specific Region Background Map (505). In this way, the user can freely without much difficulty enjoy the benefit that one can flexibly change the MGL background screen, depending one's preference.

Now, as described above, under the condition that the Specific Region Background Map (505) is utilized as the background of the MGL Execution Screen (501), the MGL Area-Specific Event Processing Module (110), by communicating with the MGL Ground Information Processing Module (112) reads out the MGL ground information prestored in its data storage area. And through this, it determines whether the Commercial Item Addition Information (506), in conjunction with the Specific Region Background Map (505), is present (see FIGS. 3 and 6).

In this case, if it is confirmed that the Commercial Item Addition Information (506), in conjunction with the Specific Region Background Map (505), is present, the MGL Area-Specific Event Processing Module (110), while communicating with the MGL Ground Information Storage Module (112), by running the set of information extracting routines, extracts the Commercial Item Addition Information (506) in conjunction with the Specific Region Background Map (505). And then, it proceeds to transfer the extracted Commercial Item Addition Information (506) to the MGL Execution Screen Processing Module (105), by communicating with the MGL Execution Screen Processing Module (105) (see FIGS. 3 and 6).

Of course, by this process, under the circumstances that the Commercial Item Addition Information (506), in conjunction with the Specific Region Background Map (505), is transmitted, the MGL Execution Screen Processing Module (105) can without much difficulty display the corresponding Commercial Item Addition Information (506) on the Specific Area Background Map (505) contained in the MGL Execution Screen (501). Thus, each mobile service provider can widely utilize the Managing System (300) in the present invention as an advertising agent (of course, because this Commercial Item Addition Information (506) is directly exposed to the eyes of the user focusing on the MGL, the advertising effect or outcome will be very great).

On the other hand, under the situation that, the MGL Execution Screen (501) is generated by the MGL Execution Screen Processing Module (105), the MGL Team Allocation Event Processing Module (111) operating in conjunction with the computing modules to be described, by communicating with the MGL Ground Information Storage Module (112), reads out the MGL ground information prestored in its data storage area. And, through this, it proceeds to check whether a Particular User's Mobile Device (21) is pre-assigned in the same team as the User's Mobile Device (10), according to the user's pre-setting (see FIG. 3).

At this time, when it is identified that a Particular User's Mobile Device (21) is pre-assigned in the same team as the User's Mobile Device (10), the MGL Team Allocation Event Processing Module (111), while communicating with the MGL Management Server (200) via the interface Module (101) and Wireless Network (30), proceeds to request the transfer of the current status information of the Particular User's Mobile Device (21) presently connecting to the MGL (that is, another user's mobile device pre-set to be assigned to the same team as the User's Mobile Device (10)) (see FIG. 3). Here, the current status information includes the Server (200) connection status information, current location information, MGL play status information of the Particular User's Mobile Device (21), etc.

Thus, under the situation when it is completed to request the current status information of the Particular User's Mobile Device (21), if the MGL Management Server (200) transmits the current status information of the Particular User's Mobile Device (21) presently connecting to the MGL>, the MGL Team Allocation Event Processing Module (111) receives the corresponding current status information via the Wireless Network (30), the Interface Module (101), etc. And then, by communicating with the MGL Execution Screen Processing Module (105), it proceeds to transmit, to the MGL Execution Screen Processing Module (105), the received current status information of the Particular User's Mobile Device (21) presently connecting to the MGL (see. FIG. 3).

Of course, by this process, under the circumstances when the current status information of the Particular User's Mobile Device (21) presently connecting to the MGL is transmitted, the MGL Execution Screen Processing Module (105) can indicate, on the MGL. Execution Screen (501), the Particular User's Mobile Device (21) assigned to the same team as the User's Mobile Device (10) with a mark different from Other Ordinary Users' Mobile Devices (20). For example, the Particular User's Mobile Device (21) is marked with a star shape, while Other Ordinary Users' Mobile Device (20) are marked with circle shapes, as shown in FIG. 7. And in the end, this enables the user to, more interestingly without much difficulty, enjoy a group-battle type of MGLs, while separating other users in the user's team from other ordinary users.

On the other hand, as described above, under the situation when on the MGL Execution Screen (501), the Particular User's Mobile Device (21) assigned to the same team as the foretold User's Mobile Device (10) is indicated with a mark different from other ordinary users' mobile devices (20), the MGL team allocation event processing module (111), while communicating with the MGL ground information storing module (112), reads out the registration information of the Particular User's Mobile Device (21) stored in its information storing area. And it proceeds to add the corresponding Particular User's Mobile Device (21) in the list of attack-prohibited other users' mobile devices, by running a set of information generating routines, on the basis of the out-read registration information of the Particular User's Mobile Device (21) and the current status information of the particular User's Mobile Device (21) presently connecting to the MGL, Here, again, the current status information includes the server (200) connection status information, current location information, and MGL login status information of the particular User's Mobile Device (21), etc.

Thus, when the list of attack-prohibited other users' mobile devices including the Particular User's Mobile Device (21) is completely generated, the MGL team allocation event processing module (111), by communicating with the MGL operating engine (106), proceeds to send the generated the list of attack-prohibited other users' mobile devices to the MGL operating engine (106).

Of course, as described above, under the circumstances when the list of attack-prohibited other users' mobile devices is transmitted, the MGL operating engine (106), while operating the MGL originated from the present invention, proceeds to block the mutual attack for virtual destruction between the user mobile device (10) and the particular User's Mobile Device (21) pre-set to be assigned to the same team as the User's Mobile Device (10). And, after all, this enables the user to more interestingly enjoy a series of MGLs as a group-battle type, without much difficulty differentiating the particular users in the same team as the user from other ordinary users.

The present invention can make various modifications according to situations.

For example, as shown in FIG. 8, the present invention may make a change to install the MGL Ground Information Storing Module (112), the MGL Scenario Storing Module (107), the Communication Speed Comparing Module (109), the MGL Area-Specific Event Processing Module (110), the MGL Team Allocation Event (111), etc., in the MGL Management Server (200) (In this case, the MGL Ground Information Storing Module (112), the MGL Scenario Storing Module (107), and the like may be installed in both the User's Mobile Device (10, 20) and the MGL Management Server (200)).

In this case also, under the circumstances when the MGL originated from the present invention is operated by the user (or the other user), the Communication Speed Comparing Module (109), in accordance with the procedure described above, by communicating via Wireless Network (30), with the Mobile Operating System (11), Mobile Function Performing Modules (12), the MGL operating Engine (106), etc. in each User's Mobile Device (10, 20), proceeds to read out the input time and input order of the user game action information or the other user game action information, the order of virtual destruction of the User's Mobile Device (10) or the Other User's Mobile Device (20), and so on (see FIG. 8).

Thus, when the input time and input order of the user game action information or the other user game action information, the order of virtual destruction of the User's Mobile Device (10) or the Other User's Mobile Device (20), and so on are completed to read, the Communication Speed Comparing Module (109), by running a set of information comparing routines, compares the input time and input order of the user game action information or the other user game action information, the order of virtual destruction of the User's Mobile Device (10) or the Other User's Mobile Device (20), and so on. And then, by running a series of information generating routines, it proceeds to create the communication speed comparison information depending on each user mobile device, having details, for example, such as "Because the communication speed of AA Kim's (010-AXXXX-BBBB) was faster than that of DD Song's (010-CCCC-FFFF) by CCC, DD Song's smartphone was destroyed (see FIG. 8)."

Through the above procedure, when the communication speed comparison information depending on each user mobile device, having details, for example, such as "Because the communication speed of A A Kim's (010-AXXXX-BBBB) was faster than that of DD Song's (010-CCCC-FFFF) by CCC, DD Song's smartphone was destroyed." is completed to create, the Communication Speed Comparing Module (109), by communicating with the MGL. Execution Screen Processing Module (105) in the User's Mobile Device (10) or the Other User's Mobile Device (20), proceeds to display the created communication speed comparison information depending on each user mobile device on the MGL Execution Screen (see FIG. 5). Thus, this enables the user or the other user to without much difficulty compare the communication speed of the User's Mobile Device (10) and that of the Other User's Mobile Device (20), under the very natural circumstances participating in the MGL.

By the way, under the circumstances that the MGL Execution Screen (501) is generated by the MGL Execution Screen Processing Module (105), the MGL Area-Specific Event Processing Module (110) installed in the MGL Management Server (200), by communicating with the MGL Ground information Storing Module (112), reads out the MGL ground information already stored in its information storage area. And through this, it proceeds to check whether a particular area is designated by the user's pre-setting as an MGL running background area (see FIG. 8).

Now, in the case when it is confirmed that a particular area is designated by the user's pre-setting as an MGL running background area, the MGL Area-Specific Event Processing Module (110), by communicating with the MGL Ground Information Storing Module (112), proceeds with a set of information extracting routines, to extract the Specific Region Background Map (505) corresponding to the foretold particular area among various background maps previously stored in an information storage area of the MGL Ground Information Storing Module (112). And then, it proceeds to transmit the extracted Specific Region Background Map (505) to the MGL Execution Screen Processing Module (105), by communicating with the MGL Execution Screen Processing Module (105) of each User's Mobile Device (10, 20) (see FIGS. 8 and 6).

Of course, under the condition that by this process, the Specific Region Background Map (505) is transmitted, the MGL Execution Screen Processing Module (105) can without much difficulty create the MGL Execution Screen (501) indicating the User's Mobile Device (10), the Other User's Mobile Device (20) located close to the User's Mobile Device (10), Attack Guidelines (502), a Command Menu (504), and the like, on the Specific Region Background Map (505). And in the end, this enable the user to freely without much difficulty enjoy the benefit that one can flexibly change the MGL background screen, depending one's preference.

By the way, as described above, under the condition that the Specific Region Background Map (505) is utilized as the background of the MGL Execution Screen (501), the MGL Area-Specific Event Processing Module (110), by communicating with the MGL Ground Information Processing Module (112), reads out the MGL ground information prestored in its information storage area. And through this, it determines whether the Commercial Item Addition Information (506), in conjunction with the Specific Region Background Map (505), is present (see FIGS. 8 and 6).

In this case, if it is confirmed that the Commercial Item Addition Information (506), in conjunction with the Specific Region Background Map (505), is present, the MGL Area-Specific Event Processing Module (110), while communicating with the MGL Ground Information Storing Module (112), by running the set of information extracting routines, extracts the Commercial Item Addition Information (506) in conjunction with the Specific Region Background Map (505). And then it proceeds to transfer the extracted Commercial Item Addition Information (506) to the MGL Execution Screen Processing Module (105) in the User's Mobile Device (10, 20), by communicating with the MGL Execution Screen Processing Module (105) (see FIGS. 8 and 6).

Of course, by this process, under the circumstances that the Commercial Item Addition Information (506), in conjunction with the Specific Region Background Map (505), is transmitted, the MGL Execution Screen Processing Module (105) in the User's Mobile Device (10, 20) can without much difficulty display the corresponding Commercial Item Addition Information (506) on the Specific Region Background Map (505) contained in the MGL Execution Screen (501). And in the end, it enables each mobile service provider to widely utilize the system in the present invention (300) even as an advertising agent (of course, because this Commercial Item Addition Information (506) is directly exposed to the eyes of the user focusing on the MGL, the advertising effect or outcome will be very great).

By the way, through the procedure described above, under the situation that, the MGL Execution Screen (501) is generated, the MGL Team Allocation Event Processing Module (111) installed in the MGL Management Server (200), by communicating with the MGL Ground Information Storing Module (112), reads out the MGL ground information previously stored in its information storage area. And through this, it proceeds to check whether a Particular User's Mobile Device (21) is already assigned in the same team as the User's Mobile Device (10), according to the user's pre-setting (see FIG. 8).

Now when it is confirmed that the Particular User's Mobile Device (21) is already assigned in the same team as the User's Mobile Device (10), according to the user's pre-setting, the MGL Team Allocation Event Processing Module (111) checks the current status information of the Particular User's Mobile Device (21) presently connecting to the MGL (that is, another user's mobile device pre-set to be assigned to the same team as the User's Mobile Device (10)). And then, by communicating with the MGL Execution Screen Processing Module (105) in the User's Mobile Device (10, 20), it proceeds to transmit the checked current status information of the Particular User's Mobile Device (21) presently connecting to the MGL, to the MGL Execution Screen Processing Module (105) (see FIG. 8). Here, the current status information includes the server (200) connection status information, current location information, MGL play status information of the Particular User's Mobile Device (21), etc.

Of course, by this process, under the circumstances when the current status information of the Particular User's Mobile Device (21) presently connecting to the MGL is transmitted, the MGL Execution Screen Processing Module (105) can indicate, on the MGL Execution Screen (501), the Particular User's Mobile Device (21) assigned to the same team as the User's Mobile Device (10) with a mark different from Other Ordinary Users' Mobile Devices (20). For example, the Particular User's Mobile Device (21) is marked with a star shape, while Other Ordinary Users' Mobile Devices (20) are marked with circle shapes, as shown in FIG. 7. And in the end, it enable the user to, more interestingly without much difficulty, enjoy a group-battle type of MGL, while separating other users in the user's team from other ordinary users.

On the other hand, as described above, under the situation when on the MGL Execution Screen (501), the Particular User's Mobile Device (21) assigned to the same team as the foretold User's Mobile Device (10) is indicated with a mark different from Other Ordinary Users' Mobile Devices (20), the MGL Team Allocation Event Processing Module (111), while communicating with the MGL Ground Information Storing Module (112), reads out the registration information of the Particular User's Mobile Device (21) stored in its information storage area. And, it proceeds to generate a list of attack-prohibited other users' mobile devices including the Particular User's Mobile Device (21), by running a set of information generating routines, on the basis of the obtained registration information of the Particular User's Mobile Device (21) and the foretold current status information of the Particular User's Mobile Device (21) presently connecting to the MGL.

Thus, when the list of attack-prohibited other users' mobile devices including the Particular User's Mobile Device (21) is completed to generate, the MGL Team Allocation Event Processing Module (111), by communicating with the MGL Operating Engine (106) in the User's Mobile Device (10, 20), proceeds to send the generated list of attack-prohibited other users' mobile devices to the MGL Operating Engine (106).

Of course, through the procedure described above, under the circumstances when the list of attack-prohibited other users' mobile devices is transmitted, the MGL operating Engine (106), while operating the MGL originated from the present invention, where one can virtually destroy Other User's Mobile Device (20) located within Attack Guidelines (502) with various kinds of attack method, such as by changing the direction of the mobile device, by using a voice input, by touching and dragging the screen with a finger, or the like. Then, it proceeds to block the mutual attack for virtual destruction between the User Mobile Device (10) and the Particular User's Mobile Device (21) pre-set to be assigned to the same team as the corresponding User's Mobile Device (10). And finally, it enables the user to more interestingly enjoy a series of MGLs as a group-battle type, without much difficulty differentiating the particular users in the same team as the user from other ordinary users.

The present invention is not limited to a particular electronic device platform and it effectively works generally on various electronic-device platforms capable of location-based games.

And, although particular embodiments of the present invention were described and illustrated in the above, it is clear that the present invention may be implemented in variously modified ways by the present inventor.

Those alternative embodiments should not be understood differently from the technological basis or point-of-view of the present invention but those alternative embodiments must fall within the scope of the claims of the present invention to be described.

Feasibility for Industrial Use

Under the system of the present invention, each mobile service provider can actively utilize mobile location-based services, through a game, one of popularly favored contents types (for example, a game virtually destroying other users' mobile devices around the user),

- as a medium that allows for the formation of large-scale social networks,
- as a medium that provides strong motivation for continually maintaining already formed social networks,
- as a medium that can even compare objectively transmission speeds of individual mobile service providers, and
- as a medium that maximizes positive aspects of digital games by changing individual and independent formats most games have, which caused unfavorable perceptions and side effects, into an open and prosocial format. And, eventually, this may prevent the total mobile service market from shrinking because of the reduction of satisfaction of the mobile service users.

SEQUENCE LISTING

10: User's Mobile Device
11: Mobile Operating System
12: Mobile Function Performing Module
20, 21: Another User's Mobile Device
30: Wireless Network
100: MGL Execution Unit
101: Interface Module
102: MGL Locally-Based Information Processing Module
103: MGL Server-based Information Processing Module
104: MGL Local State Information Processing Module
105: MGL Execution Screen Processing Module
106: MGL Operating Engine
107: MGL Scenario Storing Module
108: Inter-user Message Processing Module
109: Communication Speed Comparing Module
110: MGL Area-Specific Event Processing Module
111: MGL Team Allocation Event Processing Module
112: MGL Ground Information Storage Module
200: MGL Management Server
300: MGL Managing System
400: Mobile Communication Service Server
501: MGL Execution Screen
502: Attack Guidelines
503: Background Map
504: Command Menu
505: Specific Area Background Map
506: Commercial item addition information

The invention claimed is:
1. A system for managing a mobile game based on the location (hereinafter MGL), characterized by the inclusion of an MGL management server required to operate an MGL, and;

an MGL execution unit that executes the foretold MGL through a user's mobile device, while installed in the foretold user's mobile device having a mobile operating system and mobile function performing modules, by communicating with the foretold MGL management server, the mobile operating system, and the mobile function performing modules, wherein the foretold MGL execution unit includes an MGL execution screen processing module, which creates an MGL execution screen indicating the foretold user's mobile device, other users' mobile devices located close to the foretold user's mobile device, and a command menu on a background map corresponding to the place where the foretold user's mobile device is located, and displays the created MGL execution screen through the foretold mobile function performing modules, and;

an MGL operating engine that, in a situation where the foretold MGL execution screen is displayed, processes the interaction, according to a prestored MGL scenario, if the foretold user's game action information is entered through the foretold mobile operating system or mobile function performing modules, in order to interact with another user's mobile device, or if another user's game action information is transmitted via the foretold MGL management server, in order to interact with the foretold user's mobile device, and that, by communicating with the foretold MGL execution screen processing module, displays the situation of the foretold interaction between the foretold another user's mobile device and the user's mobile device, through the foretold MGL execution screen, and wherein the foretold MGL execution unit or the MGL management server includes a communication speed comparing module, under the situation when another user's mobile device or the user's mobile device, described above, is virtually destroyed by the MGL operating engine, by communicating with the foretold MGL management server, mobile operating system, mobile function performing modules, and MGL operating engine, that compares the input time and input order of the foretold user's game action information and another user's game action information, and the order of virtual destruction of the foretold user's mobile device or another user's mobile device, that generates the communication speed comparison information, depending on what mobile device the user has, resulting from the comparing process, and that displays the created communication speed comparison information, depending on what mobile device the user has, on the foretold MGL execution screen, by communicating with the foretold MGL execution screen processing module.

2. The system in claim 1, wherein the MGL execution unit additionally includes an inter-user message processing module that transmits the corresponding message of the user's toward the foretold MGL management server, if a user's message is entered through the foretold command menu, so that the foretold message of the user's may be shown through another user's mobile device, and, in addition, that shows the corresponding message of another user's, through the foretold MGL execution screen, by communicating with the foretold MGL execution screen processing module, in case when another user's message is transmitted from the foretold MGL management server.

3. The system in claim 1, wherein the mobile device includes an MGL area-specific event processing module, under the situation when the MGL execution screen is generated by the foretold MGL execution screen processing module, that reads out the prestored MGL ground information, that checks whether a particular region is predetermined to be an MGL execution background area, that extracts the specific area background map corresponding to the particular region, if the particular region is predetermined to be an MGL execution background area, and that transmits the extracted specific area background map toward the foretold MGL execution screen processing module, so that the foretold specific area background map may be utilized as the background of the foretold MGL execution screen.

4. The system in claim 3, wherein, under the situation when the foretold specific area background map is utilized as the background of the foretold MGL execution screen, the foretold MGL area-specific event processing module reads out the prestored MGL ground information, extracts the commercial item addition information in conjunction with the foretold specific area background map, and transmits the extracted commercial item addition information toward the foretold MGL execution screen processing module, so that the foretold commercial item addition information may be inserted on the foretold specific area background map.

5. The system in claim 1, wherein the foretold MGL execution unit or MGL management server additionally includes an MGL team allocation event processing module, under the situation when the MGL execution screen is generated by the foretold MGL execution screen processing module, that reads out the pre-stored MGL ground information, that checks whether a particular user's mobile device is preset to be in the same team as the foretold user's mobile device, that receives the current status information of the particular user's mobile device presently connecting to the MGL, by communicating with the foretold MGL management server, if the particular user's mobile device is preset to be in the same team as the foretold user's mobile device, and that transfers the received current status information of the particular user's mobile device to the foretold MGL execution screen processing module, so that the particular user's mobile device preset to be in the same team as the foretold user's mobile device may be marked differently from other ordinary users' mobile devices, on the foretold MGL execution screen.

6. The system in claim 5, wherein the MGL team allocation event processing module, under the situation when the particular user's mobile device preset to be in the same team as the foretold user's mobile device is marked differently from other ordinary users' mobile devices, transmits a list of attack-prohibited other users' mobile devices including the foretold particular user's mobile device, by communicating with the foretold MGL operating engine, so that the attack for virtual destruction between the foretold user's mobile device and the particular user's mobile device preset to be in the same team as the foretold user's mobile device may be mutually blocked.

\* \* \* \* \*